United States Patent [19]
Swier et al.

[11] Patent Number: 5,740,946
[45] Date of Patent: Apr. 21, 1998

[54] MODULAR COMPOSED MACHINE FOR DISPENSING HOT BEVERAGES SUITABLE FOR CONSUMPTION

[75] Inventors: Siwart Gerhardus Swier, Baarn; Petrus Josephus Carolus Piscaer, Rotterdam, both of Netherlands

[73] Assignee: Sara Lee/DE N.V., Utrecht, Netherlands

[21] Appl. No.: 596,869

[22] Filed: Feb. 13, 1996

[30] Foreign Application Priority Data

Feb. 13, 1995 [NL] Netherlands ............ 9500291

[51] Int. Cl.$^6$ .................................. B67D 5/56
[52] U.S. Cl. ................ 222/129.1; 222/145.5; 222/478
[58] Field of Search ............ 222/129.1, 523, 222/145.5, 146.5, 145.7, 478; 138/155

[56] References Cited

U.S. PATENT DOCUMENTS 4,068,781  1/1978  Toth ............................ 222/52
4,506,813  3/1985  Dughan et al. .............. 222/590

FOREIGN PATENT DOCUMENTS 541692  1/1985  Australia .
1576522  8/1969  France .

*Primary Examiner*—Gregory L. Huson
*Attorney, Agent, or Firm*—Merchant, Gould, Smith, Edell, Welter, & Schmidt, P.A.

[57] ABSTRACT

The invention relates to a machine for dispensing hot beverages suitable for consumption, comprising at least one beverage-dispensing device for dispensing a hot base beverage such as coffee, tea and chocolate, and at least one additive-dispensing device for dispensing an additive to be optionally added to the hot base beverage. The machine further comprises a main discharge channel having an inlet and at least one outlet for dispensing the hot beverage into a container, the inlet being connected to the beverage-dispensing device. The main discharge channel is composed of a number of series-connected modules which each comprise a subchannel having a main inlet and a main outlet, the main outlet of the first module of a first and a second series-connected module being connected to the main inlet of the second module in a liquid-tight manner, and the subchannels of the series-connected modules forming the main discharge channel. At least one module is provided with a side channel which opens into the subchannel of the module and which has an ancillary inlet connected to an additive-dispensing device.

17 Claims, 5 Drawing Sheets

MODULAR COMPOSED MACHINE FOR DISPENSING HOT BEVERAGES SUITABLE FOR CONSUMPTION

The invention relates to a machine for dispensing hot beverages suitable for consumption, comprising at least one beverage-dispensing device for dispensing a hot base beverage such as coffee, tea and chocolate, and at least one additive-dispensing device for dispensing an additive to be optionally added to the hot base beverage, such as for instance milk, cream and alcoholic beverages, the machine further comprising a main discharge channel having an inlet and at least one outlet for dispensing the hot beverage into at least one container, the inlet being connected to the beverage-dispensing device and the main discharge channel forming an outflow path for the base beverage from the beverage-dispensing device to the outlet.

Such machines are known per se and are frequently used in for instance hotels, restaurants, cafes, etc. In European patent application 472272, issued as Patent EP-B-0472272, for instance, a machine for preparing coffee is described. The beverage-dispensing device consists of a device which is suitable for dispensing hot black coffee. The additive-dispensing device consists of a device comprising an emulsifying unit for dispensing frothed milk. Hence, according to the European patent, the base beverage consists of black coffee, while the additive consists of frothed milk. In use, the beverage-dispensing device will dispense coffee which is conveyed via the main discharge channel to a container disposed under the outlet. The apparatus further comprises a second main discharge channel connected to the additive-dispensing device. In use, the additive-dispensing device will dispense frothed milk which is conveyed via the second main discharge channel to the above-mentioned container. The delivery of frothed milk and black coffee takes place simultaneously. This machine, known per se, has as a drawback that a second main discharge channel is present for dispensing frothed milk. Such a second channel occupies much space and moreover entails an economical drawback. In addition, a machine according to such a concept is entirely unsuitable for selectively adding more additives to the base beverage. If, for instance, an additive-dispensing device for dispensing for instance cream were present, this would mean that a third main discharge channel had to be present for conveying the cream to the container. In general, a compact machine will have no room for a third discharge channel. It will be understood that there is no room at all for a fourth and fifth discharge channel when the machine were provided with still other additive-dispensing devices. A further drawback of the machine known per se is that the concept of the machine is entirely inflexible. What is meant here is that a designer should in principle design a completely different machine when for instance three instead of one additive-dispensing device are present for selectively dispensing different additives to the base. The invention meets all these problems and has as a characteristic feature that the main discharge channel is composed of a number of series-connected modules which each comprise a subchannel having a main inlet and a main outlet, the main outlet of the first module of a first and second series-connected module being connected to the main inlet of the second module in a liquid-tight manner, and the subchannels of the series-connected modules forming the main discharge channel, whilst further at least one module is designed as an additive module provided with a side channel which opens into the subchannel of the additive module and has an ancillary inlet connected to an additive-dispensing device.

Hence, in accordance with the invention, the additive is fed to the at least one container via at least a part of the main discharge channel. Also when the machine comprises two or more additive-dispensing devices, the relevant additives can be fed to the container via one and the same main discharge channel. As the main discharge channel is entirely composed of modules, the machine can be designed in many different embodiments, as desired by the purchaser, without involving the necessity the design the entire machine over again. The series-connected modules are preferably of a standard design, so that a number of modules can selectively be combined in a simple manner to obtain a main discharge channel to which not only the base beverage, but also various additives can be supplied. In general, during their transport to the container, the additives will pass through a part of the main discharge channel only. However, the base beverage will pass through the entire discharge channel for the transport to the container. This entails the advantage that during the transport to the container, the base beverage entrains additives left behind in a module, if any, which may be the case because additives are usually supplied in small quantities only and, moreover, usually have somewhat sticky characteristics. After all, the base beverage will have a flow rate such that additives left behind in the module are soaked off to be subsequently entrained, in dissolved form, with the flow of the base beverage.

In order to make optimum use of this effect, the machine is preferably further provided with a control device which controls the beverage-dispensing device and the additive-dispensing device so that first the liquid additive is supplied to the at least one container, whereupon the base beverage is supplied to the container. The machine according to the invention will be specified with reference to a number of exemplary embodiments as shown in the accompanying drawings. In the drawings:

FIG. 1 schematically shows a possible embodiment of the machine according to the invention;

Figure 1:
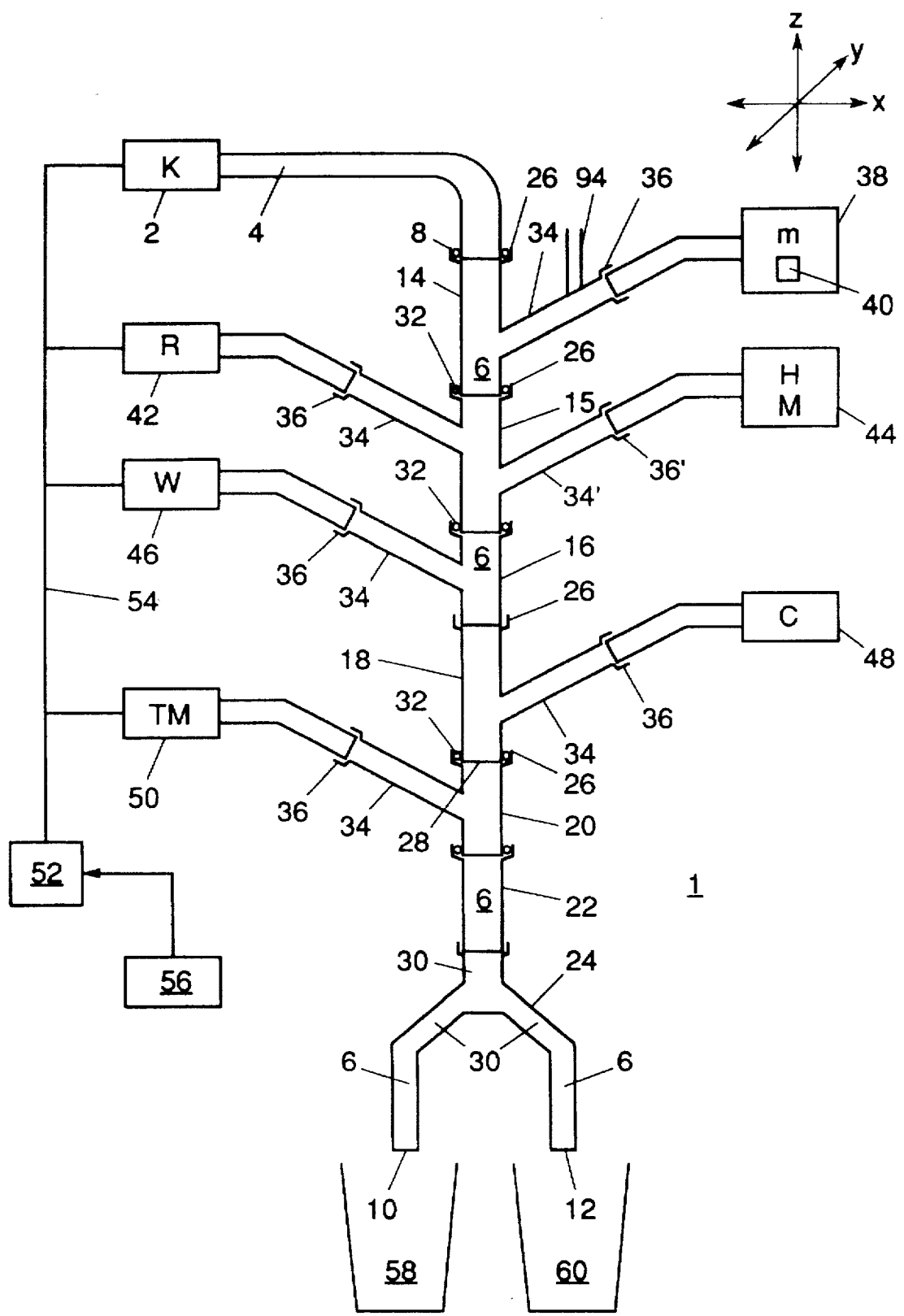
Figure 3:
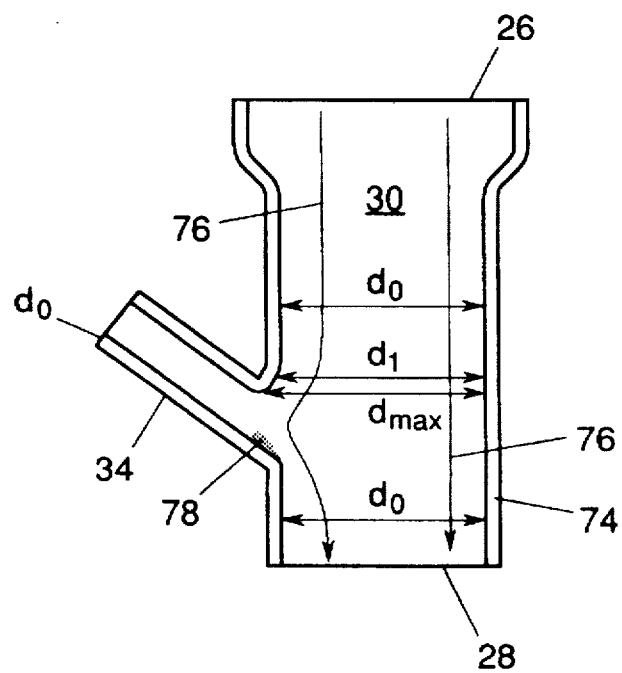
FIG. 3 shows a preferred embodiment of an additive module according to FIG. 1.

In FIG. 1, reference numeral 1 designates an embodiment of a machine for dispensing hot beverages, suitable for consumption, according to the invention. In this example, the machine comprises a beverage-dispensing device 2, known per se, which is suitable for dispensing hot black coffee to a pipe 4. The apparatus further comprises a main discharge channel 6 having an inlet 8, a first outlet 10 and a second outlet 12. In the example, the main discharge channel 6 extends between the inlet 8 at one end and the first and second outlets 10, 12 at the other. In this example, the main discharge channel is composed of a number of series-connected modules 14–24. Each module comprises at least one main inlet 26 and at least one main outlet 28. In FIG. 3, this is shown in more detail for the module 16 according to FIG. 1. Further, each module comprises a subchannel 30 extending between the main inlet 26 and the main outlet 28.

As appears from the drawing, the main outlet 28 of the first module (for instance module 18) of a first and a second series-connected module is connected to the main inlet of the second module (for instance module 20). In this example, this connection is constructed in a liquid-tight manner by means of flexible rubber rings 32. The subchannels of the modules 14–24 together form—in combination the above-mentioned main discharge channel 6.

In this example, the modules 14, 15, 16, 18 and 20 are constructed as what will hereinafter be referred to as additive modules. Each additive module comprises a side channel 34 opening into the subchannel 30 of the additive module, which side channel 34 has an ancillary inlet 36 connected to an additive-dispensing device. In this example, the ancillary inlet 36 of the additive module 14 is connected to an additive-dispensing device 38 suitable for dispensing frothed milk. The additive-dispensing device 38 is of a generally known type and for this purpose comprises an emulsifying device 40, shown schematically in the drawing. As appears from the drawing, the additive module 15 comprises a first side channel 34 having a first ancillary inlet 36, and a second side channel 34' having a second ancillary inlet 36'. The first ancillary inlet 36 of the additive module 15 in this example comprises an additive-dispensing device 42 suitable for dispensing coffee cream. Further, the second ancillary inlet 36' is connected to an additive-dispensing device 44 suitable for dispensing hot milk. The ancillary inlet 36 of the additive module 16 is connected to an additive-dispensing device 44 for dispensing whisky. Finally, the ancillary inlets 36 of the additive modules 18 and 22 are connected to additive-dispensing devices 48, 50 respectively for dispensing hot chocolate and tia maria respectively. The machine further comprises a control device 52 which controls the beverage-dispensing device 2 and the additive-dispensing devices 38–50 by means of lines 54.

Finally, the machine is further provided with an input device 56 with which an operator can input which hot beverage is to be dispensed by the machine 1 into, in this case, two containers 58 and 60. The operation of the system is as follows. At control panel 56, an operator inputs that for instance coffee with hot milk should be dispensed. These data are fed to the control unit 52. Next, by means of line 54, the control unit 52 controls the additive-dispensing device 44 to dispense a predetermined quantity of hot milk. Next, the hot milk flows via the side channel of the additive module 15 to the main discharge channel 6. It will be clear that the dosed quantity of hot milk is divided by the module 24 into at least two substantially equal quantities, so that to each container 58, 60 approximately an equal quantity of hot milk is supplied via the outlets 10, 12. After this quantity of hot milk has been dispensed, the control device 52 controls the beverage-dispensing device 2, which will then dispense a predetermined quantity of black coffee. This black coffee will pass through the subchannels 30 of all modules 14–24 to be finally fed to the two containers 58 and 60, equally divided. Possible residues of hot milk which are still contained in one or more of the modules 15, 16, 18, 20, 22 or 24, will be washed away by the hot coffee. This has of course the advantage that no mixing of flavors can occur when an operator subsequently wants to prepare two cups of coffee of a different type. It may be clear that in a similar manner, coffee with frothed milk (cappuccino), coffee with cream, coffee with whisky (Irish coffee), coffee-choco (coffee with chocolate) and coffee with tia maria can be prepared. Of course, it is also possible to prepare other combinations, such as for instance coffee with whisky and chocolate added thereto. It will be understood that the apparatus according to FIG. 1 has the advantage that a wide variety of hot beverages can be prepared with relatively simple means. It is also possible to modify the machine 1 in a simple manner in order that other types of hot beverages can be dispensed. For instance, the beverage-dispensing device 2 can be replaced by a beverage-dispensing device suitable for dispensing hot tea or chocolate. In the case of hot tea, the additive-dispensing device 38 can for instance be designed so as to be suitable for dispensing lemon juice. The additive-dispensing devices 42, 46 and 48 can for instance be replaced by devices suitable for dispensing other additives usual for tea, such as strawberry juice, currant juice and apple juice. In that case, the additive-dispensing device 50 can be omitted and the ancillary inlet 36 can for instance be closed off by means of a sealing cap.

In accordance with the invention, it is also possible to build, in a very simple manner, a machine which is adapted to the user's wish. After all, a smaller or larger number of additive modules can for instance be selectively used for assembling a main discharge channel 6 with a number of side channels. In particular, for instance additive modules 18 and 20 can be left out, whilst accordingly, modules 22 is directly attached to module 16. As a matter of fact, in this connection, a module 22 only has the function of extension piece. To enable incorporation of a large number of additive-dispensing devices into a machine, the various side channels 34 can take up different orientations relative to one another. In the example of FIG. 1, the side channels have alternately opposite directions, viewed from the top downwards. This permits a number of the additive-dispensing devices to be arranged on the left-hand side of the main discharge channel 6 and a number of the additive-dispensing devices to be arranged on the right-hand side of the main discharge channel 6. In that case, a machine can be provided which is wider in the direction X than in the direction Y. In this connection, the direction Z is drawn in the direction of the main discharge channel 6 and the directions X, Y and Z are perpendicular relative to one another.

Of course, it is also possible to assemble a machine wherein the dispensing devices 2, 38–50 are proportionally distributed around the main discharge channel 6.

Figure 2:
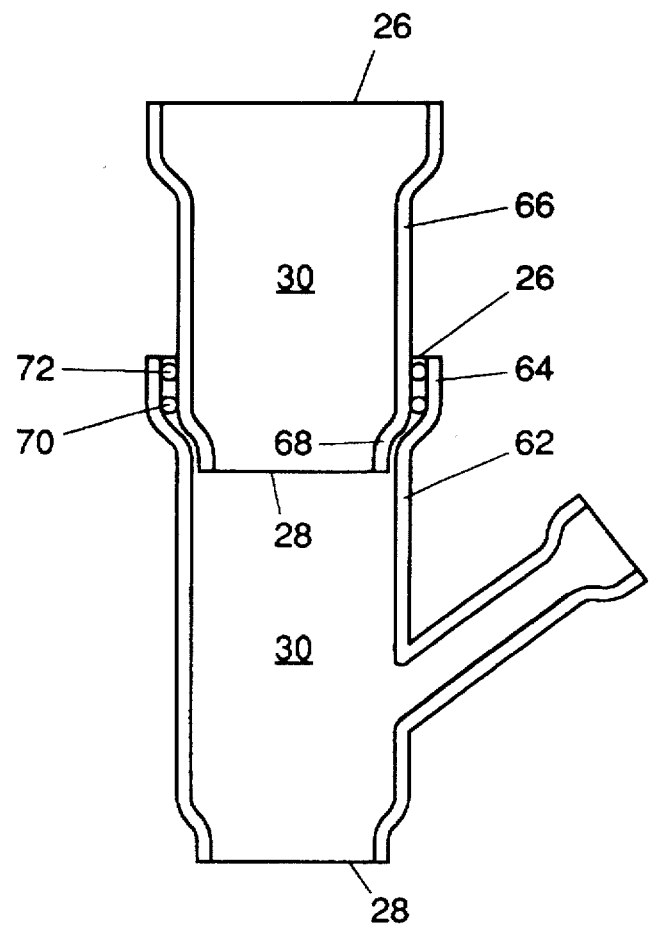
FIG. 2 shows an embodiment of the coupling between two modules according to FIG. 1.

FIG. 2 shows a particular embodiment of two modules coupled to each other. The main inlet 26 of the first module 62 comprises a socket 64 wherein an outlet piece of the main outlet 28 of the second module 66 is received. The outlet piece of the second module 66 also comprises a reduced portion 68 which extends upstream from the free end of the outlet piece and which extends at least partly into the inside of the socket 64 of the first module 62. In this case, two sealing rings 70, 72 are included between the reduced portion and the socket, which sealing rings ensure that the first and second modules are interconnected in a liquid-tight manner. Moreover, the thickness of the sealing rings is chosen so that they are clampingly included between the first and second modules so that the two modules are firmly attached to each other. In this case, however, the two modules are attached to each other in a detachable manner, which offers the advantage that, if so desired, the configuration of the machine can be altered or the module can be replaced by another, should this be desired for whatever reason.

FIG. 3 shows an alternative embodiment of an additive module 74 suitable for being used in the machine of FIG. 1. Upstream of the side channel 34, the diameter $d_1$ of the subchannel 30 increases in downstream direction until a maximum diameter $d_{max}$ is reached. The minimum diameter $d_1$ is $d_0$, as is shown in the Figure. This has as an advantage that the base beverage will flow through the subchannel 30 with a flow profile 76 as is shown in FIG. 3. This proves that possible residues 78 of additives which are left behind adjacent the end of the side channel 34 will be entrained as base beverage. In other words, the end of the side channel 34 will be drained by the base beverage. Preferably, the side channel 34 will extend from its free end 80 in the direction of the main outlet 28 of the relevant module (see FIG. 3).

This will further facilitate the draining of the side channel 34, as a result of the action of gravity.

Figure 4:
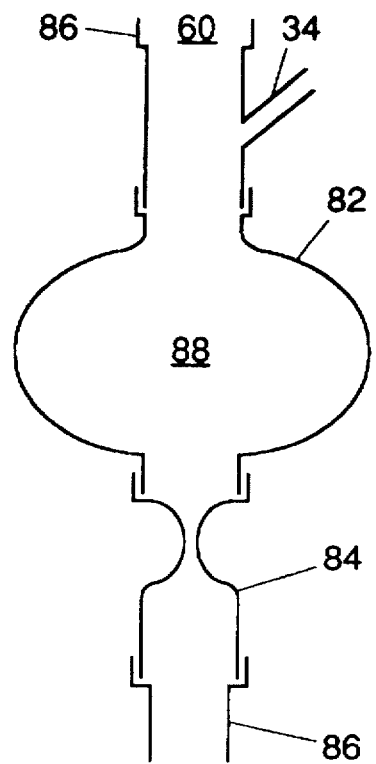
FIG. 4 shows a particular embodiment of a module comprising a mixing chamber.

FIG. 4 shows an assembly of an additive module 80, a module 82, a module 84 and a module 86 to be used in the apparatus according to FIG. 1. In this example, the module 82 comprises a mixing chamber 88 located downstream of the side channel 34 of the module 80. If for instance the base beverage 2 is fed to the main inlet 28 of the module 80 while more or less simultaneously lemon juice is fed to the side channel 34 of the module 80, the base beverage and the additive will end up more or less simultaneously in the mixing chamber 88, where they will be able to mix properly. In the example, this effect is even reinforced as the module 84 comprises a subchannel of a locally reduced diameter. This has as a result that the flow rate of the beverage through the mixing chamber 88 will decrease so that the average residence time of the beverage in the mixing chamber will increase and, accordingly, the mixing process can take place for a longer period.

Figure 5:
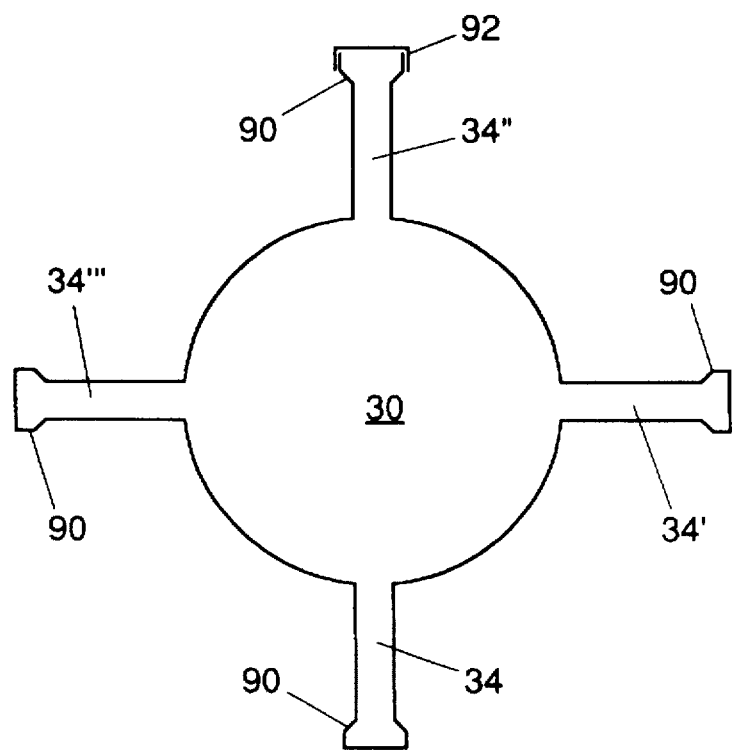
FIG. 5 shows a top-plan view of a possible embodiment of a module according to the invention.
Figure 6:
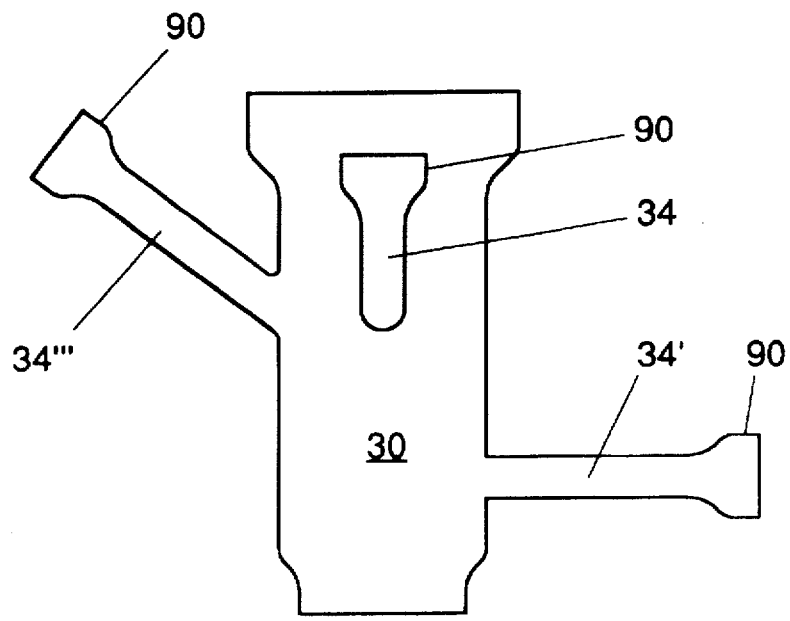
FIG. 6 shows a side elevation of the module according to FIG. 5.

FIGS. 5 and 6 show an additive module having four side channels 34, 34', 34" and 34'". Each side channel 34 comprises a socket 90. FIG. 5 further demonstrates that the side channels are evenly distributed around the subchannel 30. In this case, the side channel 34" is closed with a sealing cap 92. Moreover, the side channel 34' is oriented perpendicularly relative to the longitudinal direction of the subchannel 60. If the base liquid flows simultaneously through the subchannel 30, an additive optionally fed to the subchannel 60 via the side channel 34' will bring about a turbulent flow, thus promoting the mixing of the base beverage and the additive.

The invention is by no means limited to the exemplary embodiments discussed hereinabove. Many variants are conceivable within the concept of the invention. For instance, as is shown in FIG. 1, the side channel 34 of for instance the additive module 14 may comprise an aeration pipe 94. The aeration pipe 94 allows the liquid to flow easily through all modules of the machine. Preferably, the module which is provided with such an aeration pipe is mounted at the top end of the main discharge channel 6.

Figure 7:
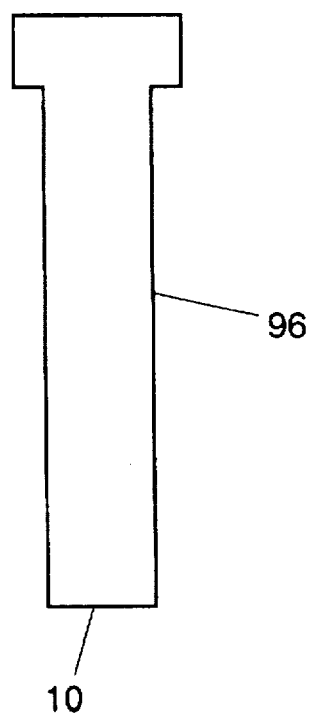
FIG. 7 shows an alternative embodiment of a module to be used in a machine according to FIG. 1.
Figure 8:
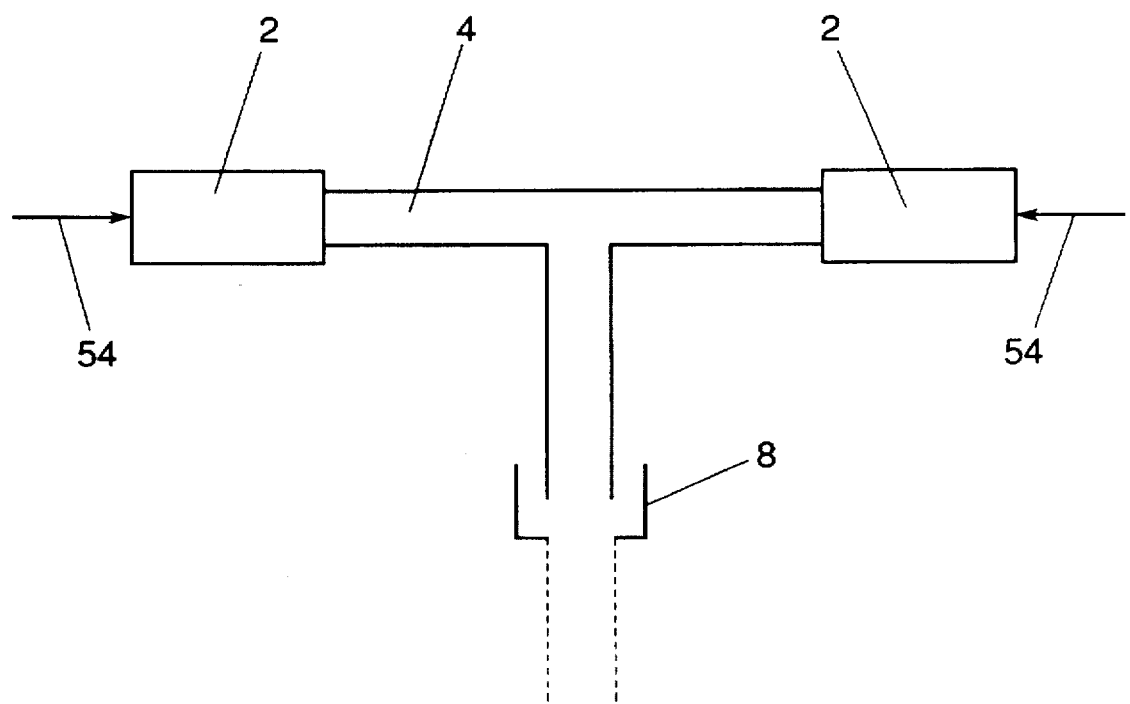
FIG. 8 shows an alternative embodiment of a part of the machine according to FIG. 1.

The attachment of a first module to a second module can also be performed in various manners. In this connection, one may also think of screw thread attachments, rapid coupling attachments and other attachments known per se. Also, the module 24 of the machine according to FIG. 1 may be replaced by a module 96 as shown in FIG. 7. In that case, the machine is only suitable for supplying the hot beverage to a container disposed under the outlet 10 of the module 96. It is also possible to replace the pipe 4 by a T-piece, a first leg of the T-piece being connected to the inlet 18, while a second leg is connected to a beverage-dispensing device 2 for dispensing hot coffee, and a third leg is connected to a beverage-dispensing device 2' for dispensing tea (see also FIG. 8). It will be understood that in that case, coffee or tea can selectively be fed as base beverage to the main discharge channel 6. Both beverage-dispensing devices 2, 2' can accordingly be controlled by the control unit 52 via line 54. To both base beverages, additives can be added in the above-described manner. These and other obvious variants are all understood to fall within the scope of the invention.

We claim:

1. A machine for dispensing hot beverages suitable for consumption, comprising at least one beverage-dispensing device for dispensing a hot base beverage such as coffee, tea and chocolate, and at least one additive-dispensing device for dispensing an additive to be optionally added to the hot base beverage, such as for instance milk, cream and alcoholic beverages, the machine further comprising a main discharge channel having an inlet and at least one outlet for dispensing the hot beverage into at least one container, the inlet being connected to the beverage-dispensing device and the main discharge channel forming an outflow path for the base beverage from the beverage-dispensing device to the outlet, characterized in that the main discharge channel is composed of a number of series-connected modules which each comprise a subchannel having a main inlet and a main outlet, the main outlet of the first module of a first and a second series-connected module being connected to the main inlet of the second module in a liquid-tight manner, and the subchannels of the series-connected modules forming the main discharge channel, whilst further at least one module is designed as an additive module provided with a side channel which opens into the subchannel of the additive module and has an ancillary inlet connected to an additive-dispensing device.

2. A machine according to claim 1, characterized in that the main inlet of the first module comprises a socket wherein an outlet piece of the second module is received.

3. A machine according to claim 2, characterized in that the outlet piece of the second module comprises a reduced portion which extends upstream from the free end of the outlet piece and which extends at least partly into the inside of the socket of the first module.

4. A machine according to claim 3, characterized in that at least one sealing ring is included between the reduced portion and the socket of two series-connected modules.

5. A machine according to claim 4, characterized in that the diameter of the subchannel of the at least one additive module decreases in downstream direction upstream of the side channel.

6. A machine according to claim 5, characterized in that the side channel of the at least one additive module lies at an acute angle to the subchannel of said module.

7. A machine according to claim 6, characterized in that the side channel extends from its free end in the direction of the main outlet of the at least one additive module.

8. A machine according to claim 7, characterized in that a subchannel of at least one module comprises a mixing chamber.

9. A machine according to claim 8, characterized in that the mixing chamber is located downstream of a side channel.

10. A machine according to claim 9, characterized in that a subchannel of at least one module comprises a locally reduced diameter.

11. A machine according to claim 10, characterized in that there is further provided a separating module comprising an inlet and a first and a second outlet for separately dispensing hot beverages to two containers.

12. A machine according to claim 11, characterized in that at least one additive module comprises at least two side channels.

13. A machine according to claim 12, characterized in that the machine comprises at least two additive modules.

14. A machine according to claim 13, characterized in that at least one additive module comprises a side channel having an aeration pipe.

15. A machine according to claim 14, characterized in that the machine further comprises a control device controlling the beverage-dispending device and the additive-dispensing device so that first the additive is supplied to the at least one container, whereafter the base beverage is supplied to the container.

16. A machine according to claim 15, characterized in that the at least one additive-dispensing device dispenses a liquid additive.

17. A machine according to claim 16, characterized in that modules are detachably connected to one another.

* * * * *